US012542022B2

(12) United States Patent
Tanaka et al.

(10) Patent No.: US 12,542,022 B2
(45) Date of Patent: Feb. 3, 2026

(54) COIN PROCESSING APPARATUS

(71) Applicant: Glory Ltd., Hyogo (JP)

(72) Inventors: Hidekazu Tanaka, Hyogo (JP); Hiroyuki Shimano, Hyogo (JP); Keigo Takezawa, Hyogo (JP); Fumio Kibihara, Hyogo (JP)

(73) Assignee: GLORY LTD., Hyogo (JP)

( * ) Notice: Subject to any disclaimer, the term of this patent is extended or adjusted under 35 U.S.C. 154(b) by 281 days.

(21) Appl. No.: 17/533,128

(22) Filed: Nov. 23, 2021

(65) Prior Publication Data

US 2022/0172547 A1 Jun. 2, 2022

(30) Foreign Application Priority Data

Nov. 30, 2020 (JP) ................................ 2020-198099

(51) Int. Cl.

| | |
|---|---|
| ***G07D 9/00*** | (2006.01) |
| ***G07F 1/02*** | (2006.01) |
| ***G07F 1/04*** | (2006.01) |

(52) U.S. Cl.

CPC ............ *G07D 9/008* (2013.01); *G07D 9/002* (2013.01); *G07F 1/02* (2013.01); *G07F 1/04* (2013.01)

(58) Field of Classification Search

CPC .. G07D 1/00; G07D 1/02; G07D 1/04; G07D 1/06; G07D 1/08; G07D 3/00; G07D 3/02; G07D 3/04; G07D 3/06; G07D 3/08; G07D 3/10; G07D 3/12; G07D 3/121; G07D 3/123; G07D 3/125; G07D 3/126; G07D 3/128; G07D 3/14; G07D 3/16; G07D 9/00; G07D 9/002; G07D 9/004; G07D 9/006; G07D 9/008; G07D 9/02; G07D 9/04; G07D 9/06; G07D 9/065; G07D 2201/00; G07D 11/14; G07D 11/60; G07F 1/00; G07F 1/02; G07F 1/04; G07F 1/041; G07F 1/042; G07F 1/043; G07F 1/044; G07F 1/045; G07F 1/046; G07F 1/047; G07F 1/048

See application file for complete search history.

(56) References Cited

U.S. PATENT DOCUMENTS 4,372,479 A 2/1983 Sciortino
6,174,230 B1 1/2001 Gerrity et al.
(Continued)

FOREIGN PATENT DOCUMENTS

CN 2570899 Y 9/2003
EP 2 905 755 A1 8/2015
(Continued)

OTHER PUBLICATIONS

Office Action issued on Nov. 3, 2022, in corresponding Australian patent Application No. 2021266252, 4 pages.
(Continued)

*Primary Examiner* — Jeffrey A Shapiro
(74) *Attorney, Agent, or Firm* — XSENSUS LLP

(57) ABSTRACT

Provided is a coin processing apparatus including: a hopper that stores a coin; a taking-in unit that takes in the coin supplied from the hopper; and a hopper moving mechanism that moves the hopper, while maintaining the hopper in a horizontal state, from a position at which the hopper covers the taking-in unit to a position so that the taking-in unit is exposed.

15 Claims, 8 Drawing Sheets

(56) References Cited

U.S. PATENT DOCUMENTS

| | | | | |
|---|---|---|---|---|
| 6,318,536 | B1 * | 11/2001 | Korman | G07D 3/16 194/347 |
| 8,844,705 | B2 * | 9/2014 | Braukmann | G07F 9/06 414/407 |
| 10,685,523 | B1 * | 6/2020 | Jagielinski | G07D 5/005 |
| 2002/0189920 | A1 * | 12/2002 | Molbak | G07F 1/04 194/347 |
| 2003/0075414 | A1 | 4/2003 | Gerrity et al. | |
| 2003/0148729 | A1 * | 8/2003 | Abe | G07D 1/02 453/57 |
| 2003/0234153 | A1 * | 12/2003 | Blake | G07D 9/008 194/347 |
| 2004/0011620 | A1 * | 1/2004 | Molbak | G07F 9/002 194/217 |
| 2004/0119225 | A1 * | 6/2004 | Yamamiya | G07F 19/202 271/180 |
| 2007/0029159 | A1 * | 2/2007 | Quattrini | G07D 3/14 194/302 |
| 2007/0144864 | A1 * | 6/2007 | Harada | G07D 3/14 194/346 |
| 2008/0082207 | A1 * | 4/2008 | Sjostrom | G07D 9/02 700/231 |
| 2008/0171508 | A1 | 7/2008 | Enomoto et al. | |
| 2014/0083814 | A1 * | 3/2014 | Nomura | G07D 11/50 194/206 |
| 2015/0262447 | A1 * | 9/2015 | Zander | G07D 11/14 194/346 |
| 2015/0302678 | A1 * | 10/2015 | Blake | G07D 9/06 453/62 |
| 2016/0379432 | A1 * | 12/2016 | Lavigne | G07D 3/14 453/3 |
| 2017/0032606 | A1 * | 2/2017 | Sperl | G07D 11/14 |
| 2017/0309103 | A1 * | 10/2017 | Bengtsson | G07D 11/00 |
| 2019/0043320 | A1 * | 2/2019 | Susaki | G07D 11/009 |
| 2019/0080553 | A1 * | 3/2019 | Hohman | G07F 17/3216 |
| 2021/0012604 | A1 * | 1/2021 | Blake | G07D 9/002 |

FOREIGN PATENT DOCUMENTS

| | | | |
|---|---|---|---|
| JP | 61-203048 | A | 9/1986 |
| JP | H09-044719 | A | 2/1997 |
| JP | 2003-067810 | A | 3/2003 |
| JP | 2004-293131 | A | 10/2004 |
| JP | 5002794 | B2 | 8/2012 |
| JP | 2012-174063 | A | 9/2012 |
| JP | 2019-046128 | A | 3/2019 |
| WO | 2010/109593 | A1 | 9/2010 |

OTHER PUBLICATIONS

Extended European Search Report dated May 9, 2022 for the corresponding European Patent Application No. 21210894.8, 7 pp.

* cited by examiner

COIN PROCESSING APPARATUS

CROSS-REFERENCE TO RELATED APPLICATION

This application is entitled to (or claims) the benefit of Japanese Patent Application No. 2020-198099, filed on Nov. 30, 2020, the disclosure of which including the specification, drawings and abstract is incorporated herein by reference in its entirety.

TECHNICAL FIELD

The present disclosure relates to a coin processing apparatus.

BACKGROUND ART

For example, as indicated in Patent Literature (hereinafter, referred to as "PTL") 1, there is conventionally known a coin processing apparatus comprising an inlet cover that is movable around a pivot shaft in a pivoting manner.

CITATION LIST

Patent Literature

PTL 1
Japanese Patent No. 5002794

SUMMARY

A coin processing apparatus according to the present disclosure comprises: a hopper that stores a coin; a taking-in unit that takes in the coin supplied from the hopper; and a hopper moving mechanism that moves the hopper, while maintaining the hopper in a horizontal state, from a position at which the hopper covers the taking-in unit to a position so that the taking-in unit is exposed.

DESCRIPTION OF EMBODIMENTS

Figure 1A:
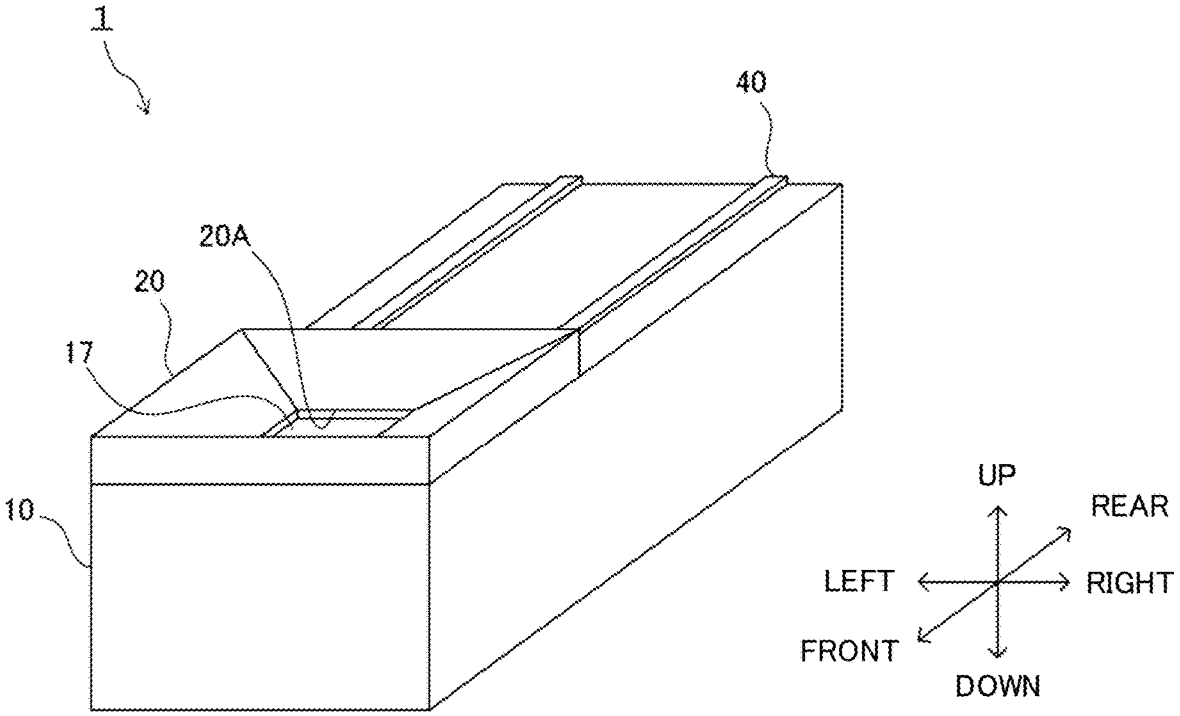
FIG. 1A is a perspective view of a coin processing apparatus according to Embodiment 1.

When a coin or a foreign object is on the cover that moves around the pivot shaft in a pivoting manner, the coin or the foreign object may enter the inlet or may be scattered around when the cover is opened.

An object of the present disclosure is to improve usability around a coin taking-in unit of a coin processing apparatus.

In the coin processing apparatus according to the present disclosure, the hopper moving mechanism may be configured to cause a translational motion of the hopper.

In the coin processing apparatus according to the present disclosure, the hopper moving mechanism may comprise a linkage.

In the coin processing apparatus according to the present disclosure, the linkage may be a parallel linkage.

In the coin processing apparatus according to the present disclosure, the linkage may be configured to expose the taking-in unit by moving the hopper from a frontward side toward a rearward side. The frontward side is a side where the taking-in unit is disposed.

In the coin processing apparatus according to the present disclosure, the hopper moving mechanism may comprise a sliding mechanism that slidingly moves the hopper in a horizontal direction, in a vertical direction or in an obliquely upward direction.

In the coin processing apparatus according to the present disclosure, the hopper moving mechanism may comprise a lifting and lowering mechanism that pushes up or pulls up the hopper.

In the coin processing apparatus according to the present disclosure, the hopper moving mechanism may comprise a damper that reduces an impact applied to the hopper.

In the coin processing apparatus according to the present disclosure, the hopper may comprise: a supply port that supplies the taking-in unit with the coin stored in the hopper; and an opening and closing member that opens and closes the supply port.

In the coin processing apparatus according to the present disclosure, the opening and closing member may be a tray that opens and closes the supply port by swinging around a rotating shaft.

The coin processing apparatus according to the present disclosure may further comprise a coin cassette attachment unit covered by the hopper when the hopper is located at the position at which the hopper covers the taking-in unit. The coin cassette attachment unit is exposed when the hopper is located at the position so that the taking-in unit is exposed.

In the coin processing apparatus according to the present disclosure, the taking-in unit may be disposed at a position at which the taking-in unit is covered by a coin cassette when the coin cassette is attached to the coin cassette attachment unit.

The coin processing apparatus according to the present disclosure may further comprise an operation display. In the coin processing apparatus according to the present disclosure, the hopper moving mechanism may be configured to move the hopper to a space downward from the operation display.

According to the present disclosure, it is possible to improve usability around a coin taking-in unit of a coin processing apparatus.

Hereinafter, embodiments of the present disclosure will be described in detail with reference to the accompanying drawings.

Embodiment 1

FIG. 1A is a perspective view of a coin processing apparatus 1 according to Embodiment 1. The coin processing apparatus 1 illustrated in FIG. 1A receives and discharges a coin in accordance with an operation of an operator. The coin processing apparatus 1 can be combined with a banknote processing apparatus (not illustrated) to form a money processing apparatus. The coin processing apparatus 1 is disposed, for example, in a back office of a store. Note that, the back office refers to an area where a money processing apparatus that manages money used in a store is disposed. The front office, on the other hand, refers to an area where a money processing apparatus that is directly operated by a customer of a store or is indirectly operated by a customer of a store via a clerk of the store is disposed.

In the following description, the "front side" of the coin processing apparatus 1 means a side of an operator who inserts a coin, and the "rear side" of the coin processing apparatus 1 means the opposite side thereof. In other words, the "front side" of the coin processing apparatus 1 means a side where a part that takes in a coin into the coin processing apparatus 1 (a taking-in unit to be described later) is provided. Further, the "left side" and "right side" of the coin processing apparatus 1 mean the left side and right side, respectively, viewed from an operator who performs at least one operation of coin insertion operation and coin discharge operation. Further, the "upper side" and "lower side" of the coin processing apparatus 1 mean the upper side and lower side, respectively, viewed from an operator of the coin processing apparatus 1.

The coin processing apparatus 1 comprises a main body 10. A feeding unit that feeds out an inserted coin to a transport path, a transport unit that transports a coin, a recognition unit that recognizes a coin, a storage unit that stores a coin, a control unit that controls each unit, and the like are disposed inside the main body 10. A hopper 20 is disposed on the upper and front side of the main body 10. The hopper 20 is a container-shaped member comprising a reception port on the upper side and a supply port 20A on the lower side. The reception port is a relatively large opening. The supply port 20A is a relatively small opening. The hopper 20 receives and temporarily stores a coin, and supplies the main body 10 with a received coin through the supply port 20A.

The hopper 20 is attached to the main body 10 via a hopper moving mechanism 40. In the present embodiment, the hopper moving mechanism 40 comprises a pair of rails extending in the front-rear direction. The hopper moving mechanism 40 is a sliding mechanism that slidingly moves the hopper 20 in a horizontal direction and in the front-rear direction while maintaining the hopper 20 in a horizontal state.

Figure 1B:
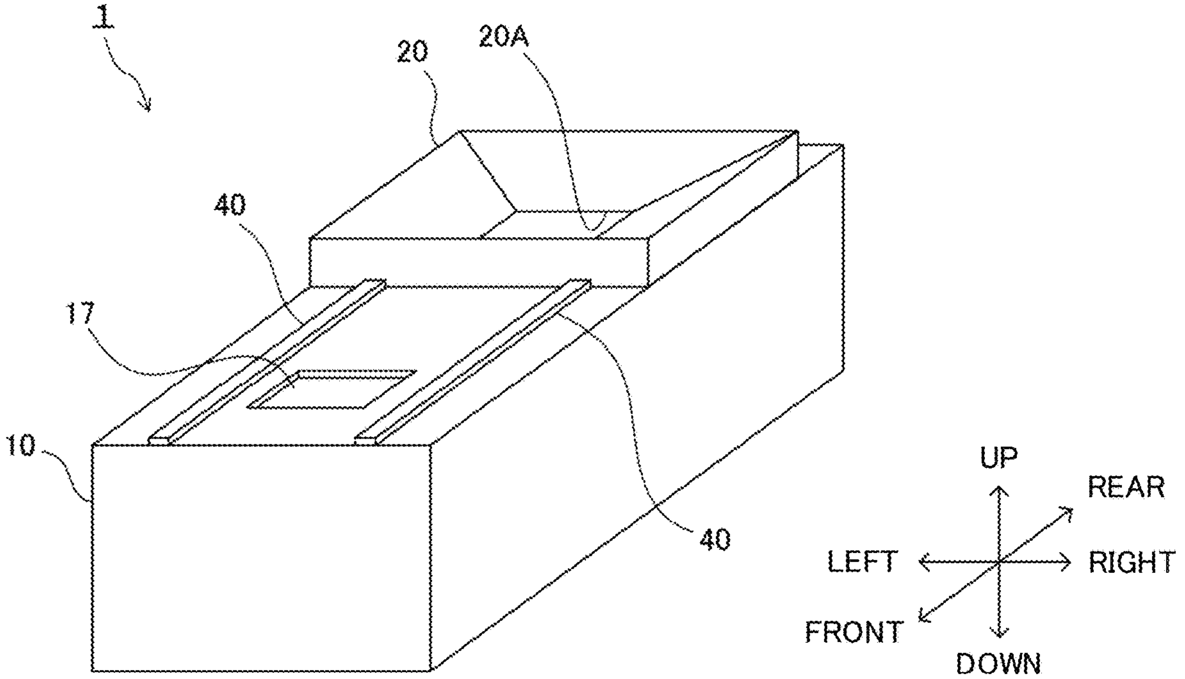
FIG. 1B is a perspective view of the coin processing apparatus according to Embodiment 1.

FIG. 1B is a perspective view of the coin processing apparatus 1 in a state in which the hopper 20 is moved rearward. A taking-in unit 17 that takes in a coin into the coin processing apparatus 1 is disposed on the upper surface of the coin processing apparatus 1. When the hopper 20 is located on a frontward side, the taking-in unit 17 is covered by the hopper 20 as illustrated in FIG. 1A. When the hopper 20 is located on a rearward side, the taking-in unit 17 is exposed as illustrated in FIG. 1B, in other words, the hopper 20 uncovers the taking-in unit 17.

When performing depositing into the coin processing apparatus 1 according to the present embodiment, an operator causes the hopper 20 to be located on the forward side. When a coin is inserted into the hopper 20 in this state, the coin is taken in into the main body 10 through the supply port 20A and the taking-in unit 17, and is subjected to predetermined processing.

Further, for example, when maintenance is performed, the hopper 20 is moved to a position at which the taking-in unit 17 is exposed. At this time, the hopper 20 moves while maintaining the horizontal state. As a result, even when a coin or a foreign object is on the hopper 20, it is possible to prevent the coin or the foreign object from dropping or being scattered into the taking-in unit 17 or around the coin processing apparatus 1. Note that, when the hopper 20 moves while maintaining the horizontal state, it is possible to more effectively prevent a coin or a foreign object from dropping or being scattered as long as the hopper 20 is configured to be capable of maintaining a state in which the supply port 20A is closed. For example, the hopper 20 can be moved in a state in which the supply port 20A is closed, by providing the hopper 20 with an opening and closing mechanism capable of opening and closing the supply port 20A, or by moving the hopper 20 while bringing the lower surface of the hopper 20, in which the supply port 20A is formed, into substantial surface contact with the upper surface of the main body 10, where the upper surface is horizontal.

Embodiment 2

Figure 2:
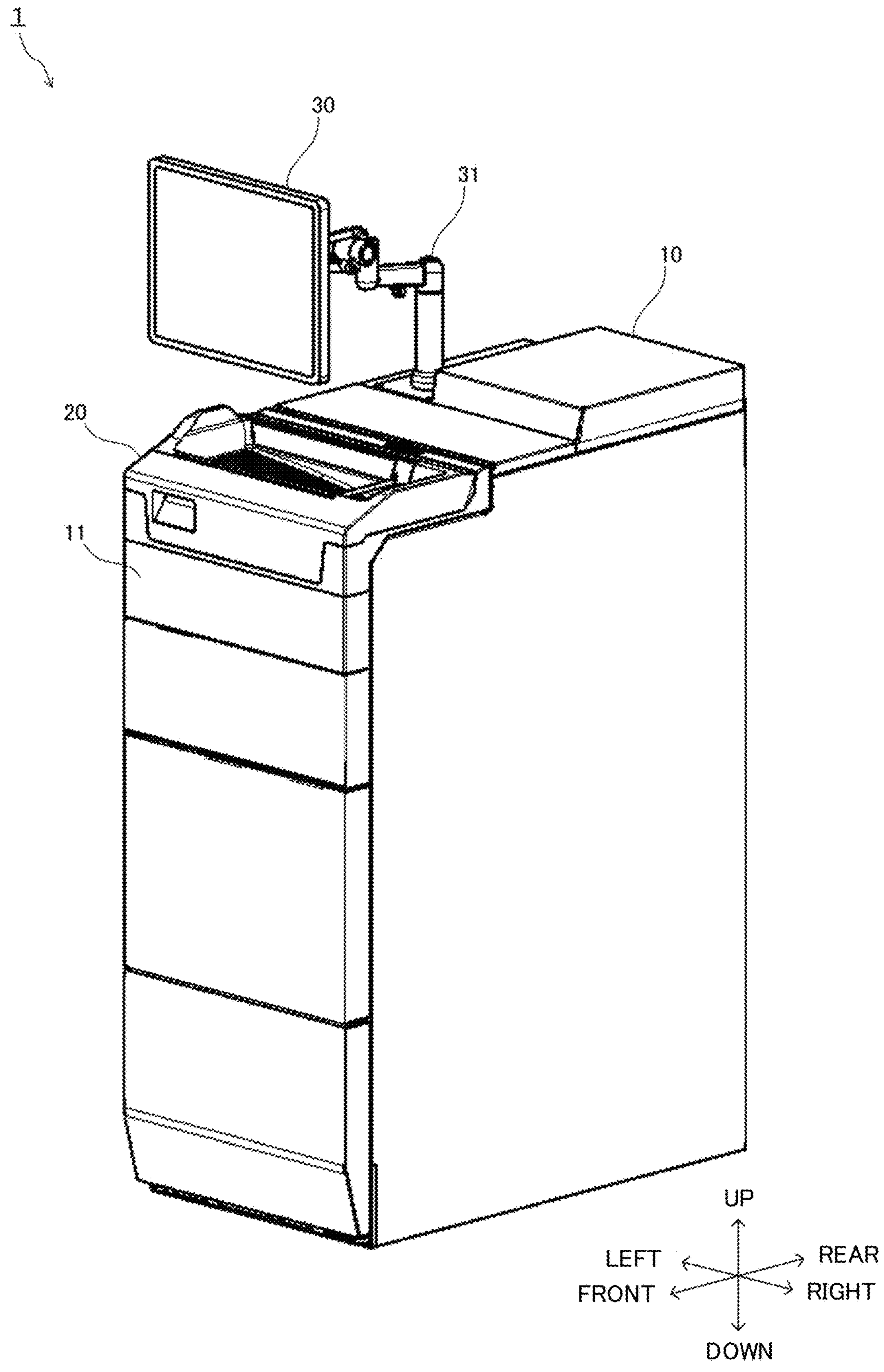
FIG. 2 is a perspective view of a coin processing apparatus according to Embodiment 2.

FIG. 2 is a perspective view of a coin processing apparatus 1 according to Embodiment 2. The coin processing apparatus 1 illustrated in FIG. 2 receives or discharges a coin in accordance with an operation of an operator. The coin processing apparatus 1 can be combined with a banknote processing apparatus (not illustrated) to form a money processing apparatus. The coin processing apparatus 1 is disposed, for example, in a back office of a store.

In the following description, the "front side" of the coin processing apparatus 1 means a side of an operator who inserts a coin, and the "rear side" of the coin processing apparatus 1 means the opposite side thereof. In other words, the "front side" of the coin processing apparatus 1 means a side where the part that takes in a coin into the coin processing apparatus 1 (the taking-in unit to be described later) is provided. Further, the "left side" and "right side" of the coin processing apparatus 1 mean the left side and right side, respectively, viewed from an operator who performs at least one operation of coin insertion operation and coin discharge operation. Further, the "upper side" and "lower side" of the coin processing apparatus 1 mean the upper side and lower side, respectively, viewed from an operator of the coin processing apparatus 1. Note that, in the present specification, the "front side" and "rear side" may be described as "forward side" and "rearward side", respectively. Further, the "left side" and "right side" may be described as "leftward side" and "rightward side", respectively. Further, the "upper side" and "lower side" may be described as "upward side" and "downward side", respectively.

The coin processing apparatus 1 comprises the main body 10. The feeding unit that feeds out an inserted coin to the transport path, the transport unit that transports a coin, the recognition unit that recognizes a coin, the storage unit that stores a coin, the control unit that controls each unit, and the like are disposed inside the main body 10. A portion on the upper and front side of the main body 10 is formed of a front surface plate 11.

The hopper 20 is disposed on the upper side of the front surface plate 11. The hopper 20 is the container-shaped member comprising the reception port on the upper side and the supply port 20A (see FIG. 3B) on the lower side. The reception port is a relatively large opening. The supply port 20A is a relatively small opening. The hopper 20 receives and temporarily stores a coin, and supplies the main body 10 with a received coin through the supply port 20A.

An operation display 30 is disposed on the upper side of the hopper 20. The operation display 30 is connected so as to be capable of transmitting and receiving a signal to and from the control unit, receives an operation of an operator on the coin processing apparatus 1, and displays various information. The operation display 30 is, for example, a touch screen display. The operation display 30 is supported by a support member 31 whose one end is fixed to the upper surface of the main body 10 such that the operation display 30 is movable to an arbitrary position. The operation display 30 may comprise a display that functions as a display unit, a physical button or a dial that functions as an operation unit, and the like.

Figure 3A:
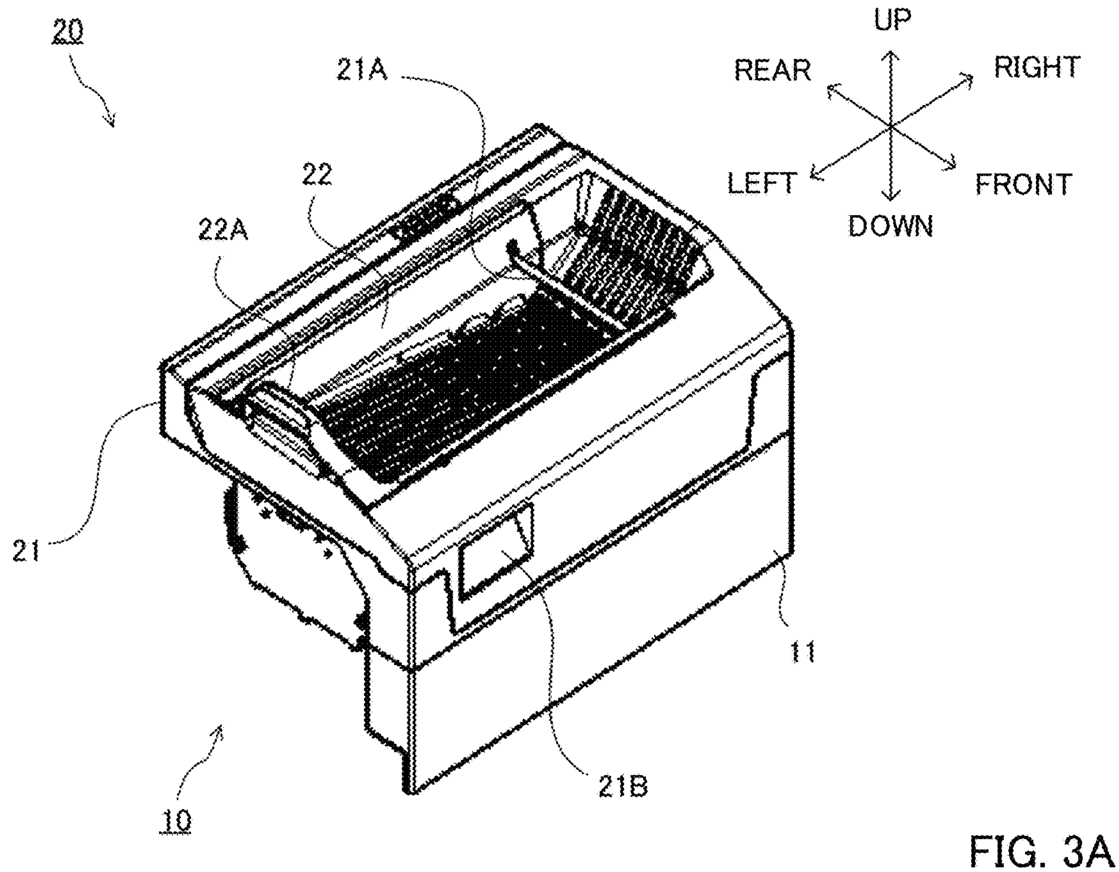
FIG. 3A is a perspective view of a portion around a hopper in a state in which a supply port is closed.

FIG. 3A is a perspective view of a portion around the hopper 20 in a state in which the supply port 20A (see FIG. 3B) is closed. The hopper 20 comprises a cover 21 and a tray 22, and covers a coin cassette attachment unit 16 and the taking-in unit 17 (see FIG. 5A) that are described later.

The cover 21 is a rectangular frame-shaped member, and comprises the supply port 20A inside the frame-shaped part. The supply port 20A is disposed at a position substantially directly above the taking-in unit 17. Further, at least a part of the frame-shaped part of the cover 21 comprises a slope having a lower height toward the supply port 20A. A shaft member 21A extending frontward and rearward is disposed on the upper side of the supply port 20A. A handle 21B that is operated by an operator is formed on the front side of the cover 21.

The tray 22 is disposed inside the frame-shaped part of the cover 21. The tray 22 comprises a left end part in which a knob part 22A is formed. The cover 21 comprises a slope having a lower height in accordance with an increasing distance from the knob part 22A. The tray 22 is connected to the cover 21 so as to be swingable around the shaft member 21A. When an operation to pinch and lift the knob part 22A is performed, the tray 22 swings around the shaft member 21A. Such an operation switches the hopper 20 from the state illustrated in FIG. 3A to the state illustrated in FIG. 3B. Note that, the tray 22 does not necessarily swing around the shaft member 21A as long as the tray 22 is swingable around a predetermined rotating shaft.

Figure 3B:
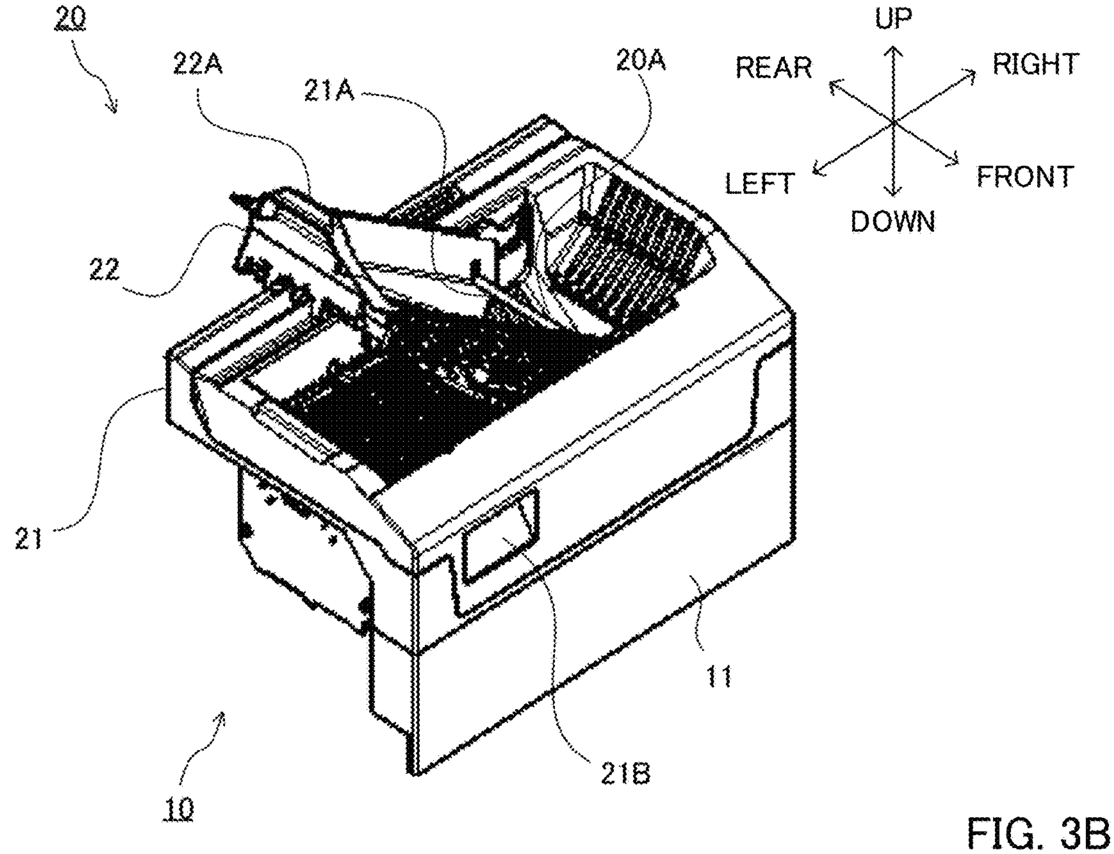
FIG. 3B is a perspective view of the portion around the hopper in a state in which the supply port opens.

FIG. 3B is a perspective view of the portion around the hopper 20 in a state in which the supply port 20A opens. The supply port 20A can be opened and closed by swinging the tray 22 in the cover 21. That is, it is possible to switch between the state of the FIG. 3A and the state of FIG. 3B.

Figure 4A:
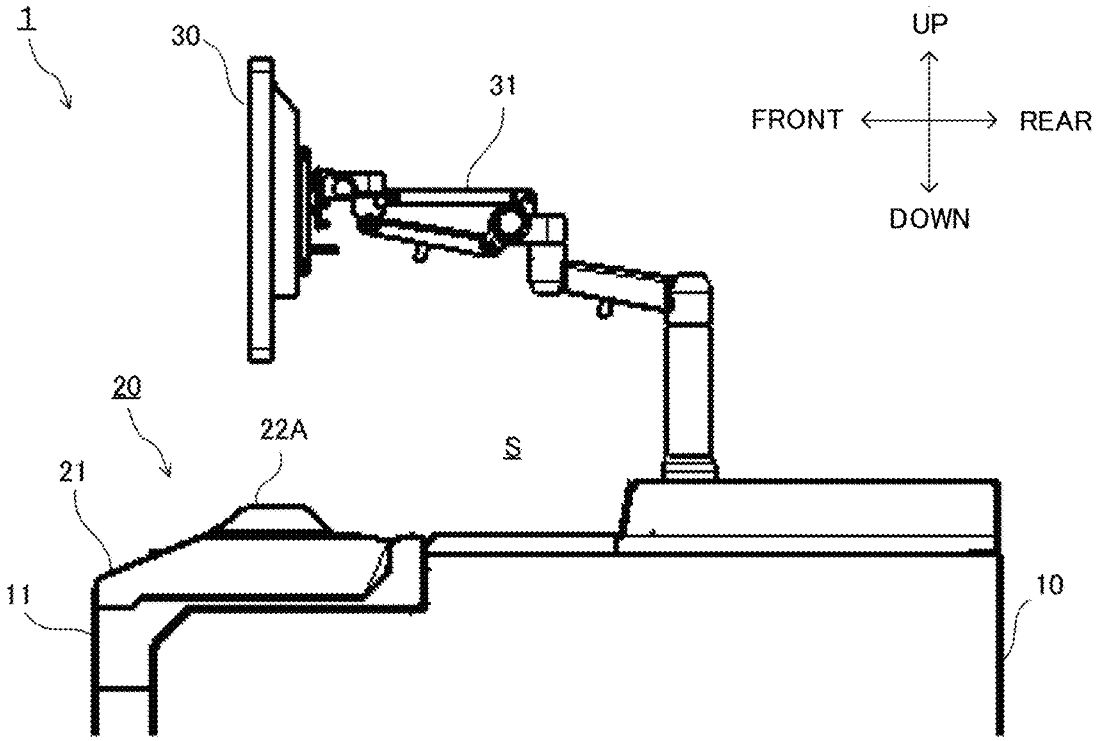
FIG. 4A is a right side view of an upper-side part of the coin processing apparatus.

FIG. 4A is a right side view of an upper-side part of the coin processing apparatus 1 in the state illustrated in FIGS. 2 and 3A, that is, in a state in which the hopper 20 covers the coin cassette attachment unit 16 and the taking-in unit 17 (see FIG. 5A) that are described later. When the hopper 20 covers the coin cassette attachment unit 16 and the taking-in unit 17, the hopper 20 is in the horizontal state. When an operator puts a finger into the handle 21B (see FIG. 3A) and lifts the hopper 20, the coin processing apparatus 1 is in the state illustrated in FIG. 4B.

Figure 4B:
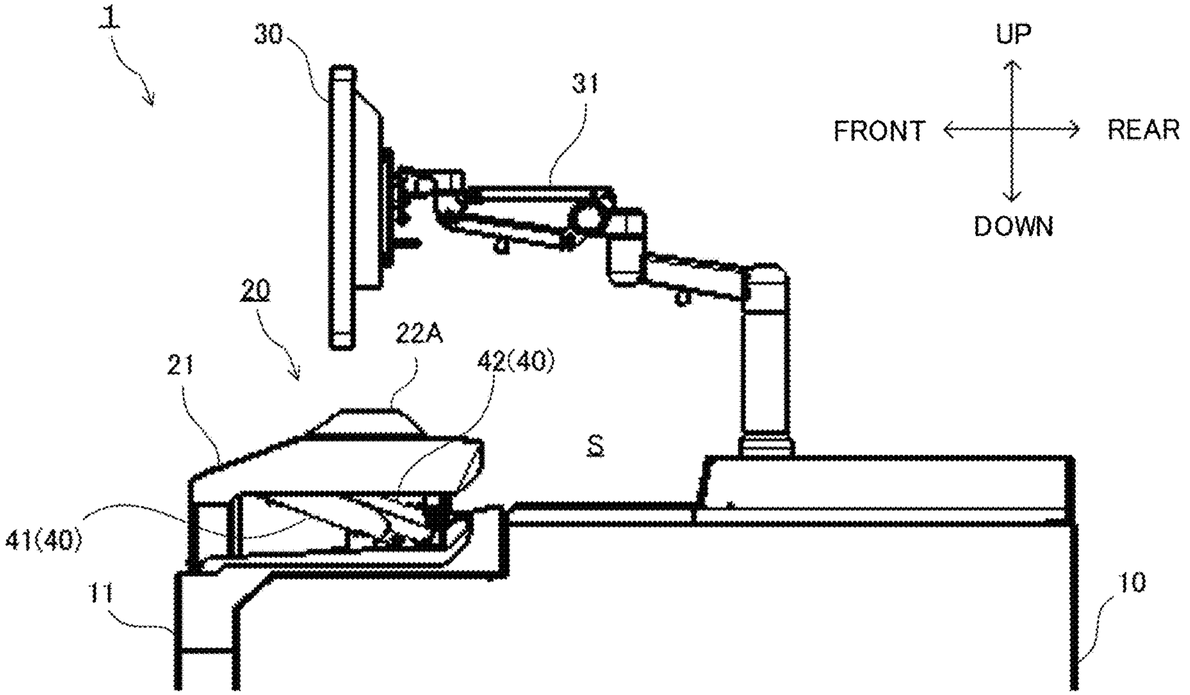
FIG. 4B is a right side view of the upper-side part of the coin processing apparatus.

FIG. 4B is a right side view of the upper-side part of the coin processing apparatus 1 in a state in which the hopper 20 is away from the front surface plate 11. The hopper 20 is attached to the main body 10 via the hopper moving mechanism 40. The hopper moving mechanism 40 comprises a total of four links with a pair of links at the right and a pair of links at the left. A first link 41 and a second link 42 on the right side connect a portion near a right end part of the hopper 20 and a portion near a right end part of the main body 10. A first link 41 (see FIG. 5A) and a second link 42 (hidden by the first link 41 on the left side in FIG. 5A) on the left side connect a portion near a left end part of the hopper 20 and a portion near a left end part of the main body 10. Each of the second links 42 on the left and right sides is disposed inward from each of the first links 41 on the left and right sides. The first links 41 and the second links 42 form a parallel linkage. Note that, in a case where a required strength can be maintained, the hopper moving mechanism 40 may comprise the first link 41 and the second link 42 on only one of the left side and the right side.

Each of one end parts of the first link 41 and the second link 42 is rotatably attached to a front-side part of the cover 21. Further, each of another end parts of the first link 41 and the second link 42 is rotatably attached to a portion near an upper end part of the main body 10. Specifically, attachment positions of the respective other end parts of the first link 41 and the second link 42 are near a position at which a rear end part of the cover 21 is located in a state in which the hopper 20 covers the coin cassette attachment unit 16 and the taking-in unit 17 (see FIG. 5A) (that is, the state illustrated in FIG. 4A). Positions at which the first links 41 and the second links 42 are fixed to the cover 21 and the main body 10 are set as positions at which the hopper 20 can move without changing the attitude, that is, positions at which the hopper 20 can perform a translational motion.

When the hopper 20 in the state illustrated in FIG. 4B is further lifted, the hopper 20 moves to the upper side and to the rear side at the same time by the action of the hopper moving mechanism 40 as the parallel linkage. At this time, the coin processing apparatus 1 is in the state illustrated in FIG. 4C.

Figure 4C:
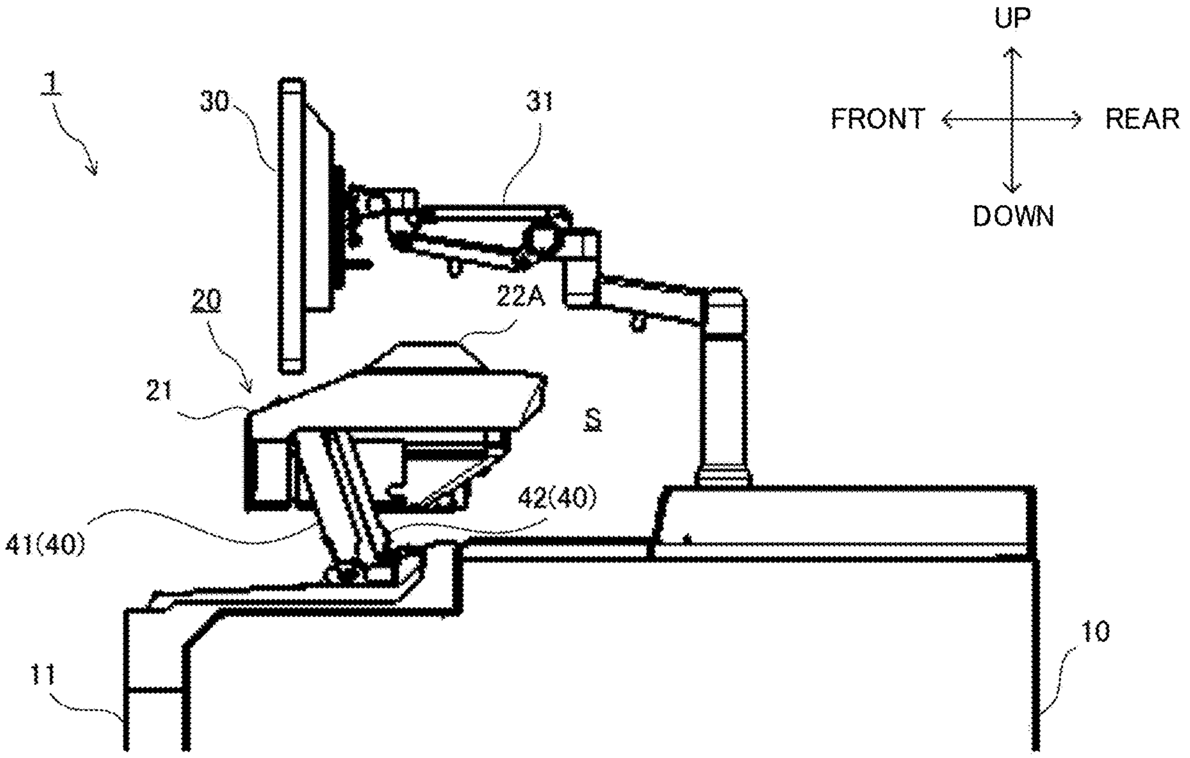
FIG. 4C is a right side view of the upper-side part of the coin processing apparatus.

FIG. 4C is a right side view of the upper-side part of the coin processing apparatus 1 in a state in which the hopper 20 is further moved. When a force is applied to the hopper 20 in the state illustrated in FIG. 4C so as to push the hopper 20 rearward, the hopper 20 passes through an uppermost part of a trajectory of movement of the hopper 20, then moves toward the rear side, and is ultimately in a state of being placed on the upper surface of the main body 10. At this time, the coin processing apparatus 1 is in the state illustrated in FIG. 4D.

Figure 4D:
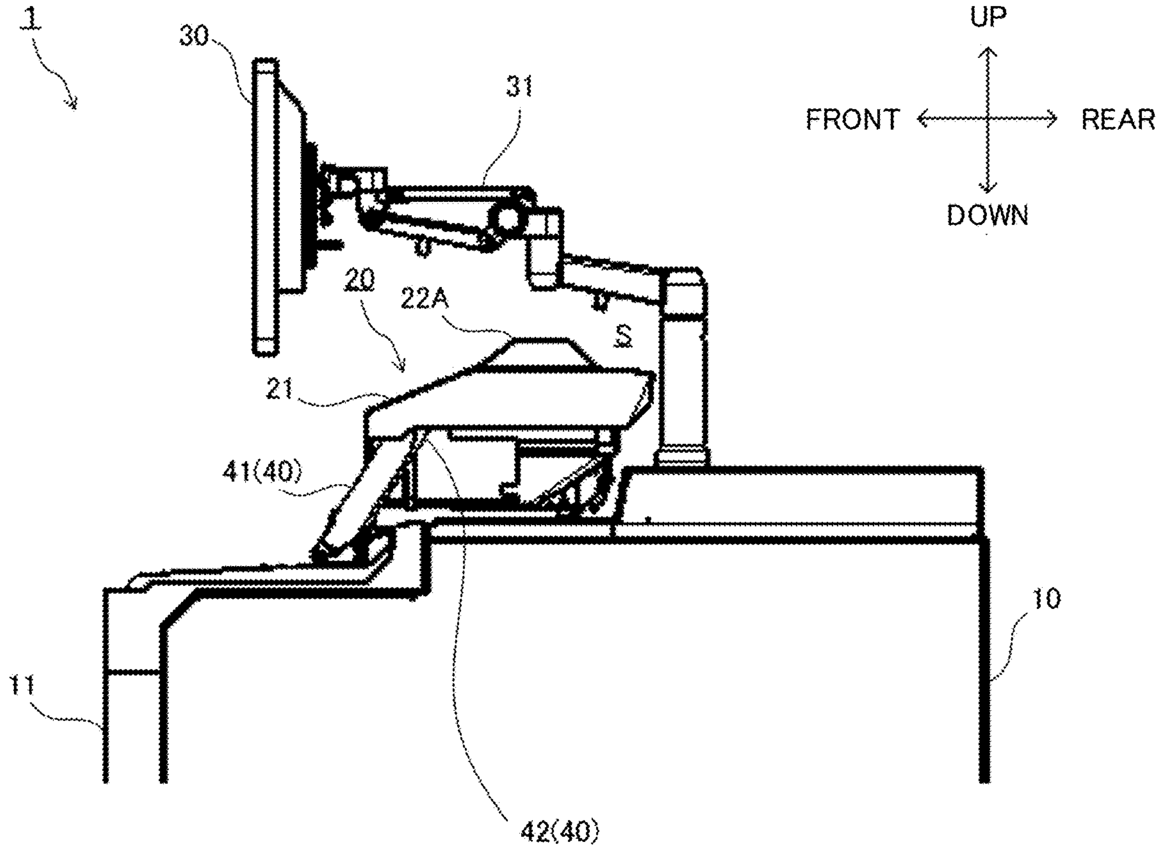
FIG. 4D is a right side view of the upper-side part of the coin processing apparatus.

FIG. 4D is a right side view of the upper-side part of the coin processing apparatus 1 in a state in which the hopper 20 is moved to a space S downward from the operation display 30. Pulling the hopper 20 in this state to a side of an operator makes it possible to return the hopper 20 to the state in which the hopper 20 covers the coin cassette attachment unit 16 and the taking-in unit 17 (see FIG. 5A) (the state illustrated in FIG. 4A). When the hopper 20 moves between the state illustrated in FIG. 4A and the state illustrated in FIG. 4D, the hopper 20 itself does not change the attitude. That is, the hopper moving mechanism 40 moves the hopper 20 while maintaining the hopper 20 in the horizontal state. More specifically, the hopper moving mechanism 40 causes a translational motion of the hopper 20 while maintaining the hopper 20 in the horizontal state.

Figure 5A:
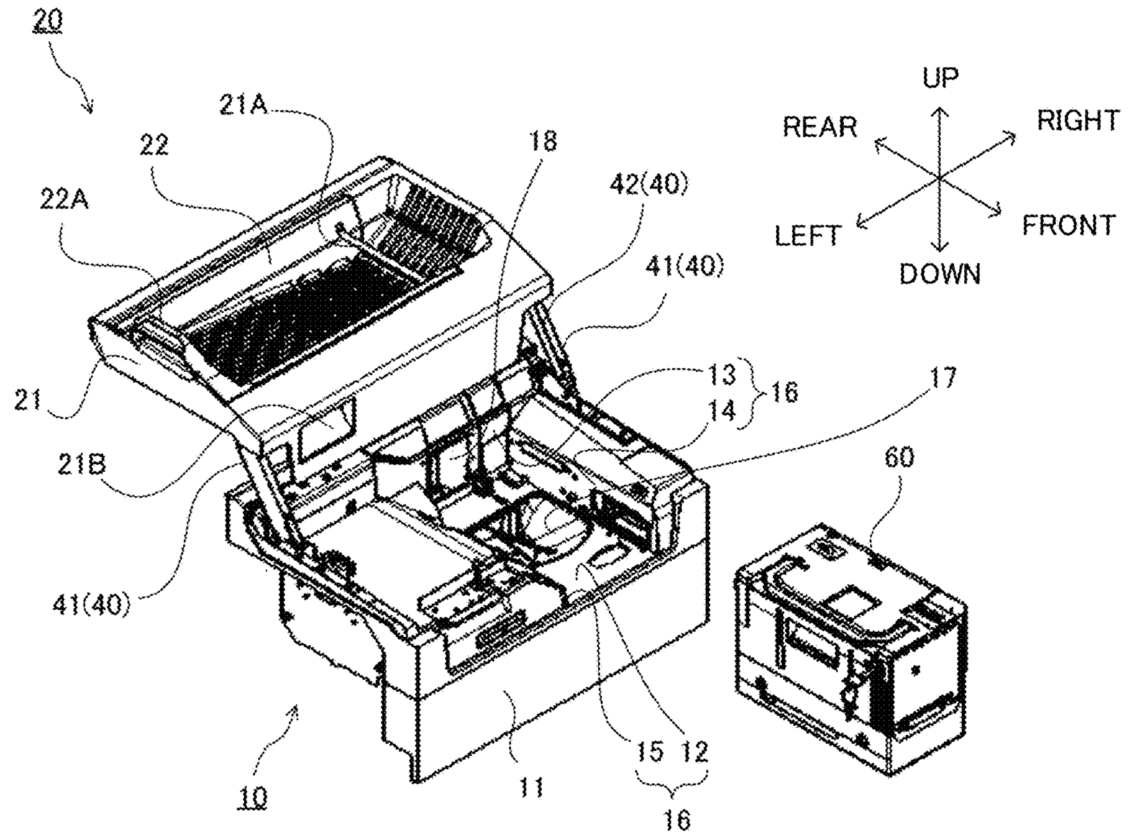
FIG. 5A is a partial perspective view of the portion around the hopper.

FIG. 5A is a partial perspective view of the portion around the hopper 20 when the hopper 20 is in the state illustrated in FIG. 4D. At this time, a part covered by the hopper 20 in the state illustrated in FIG. 4A is exposed.

As illustrated in FIG. 5A, the main body 10 comprises a cassette placement surface 12, a cassette abutting surface 13, a right-side guide surface 14, and a left-side guide surface 15 upward from the front surface plate 11. The cassette placement surface 12, the cassette abutting surface 13, the right-side guide surface 14, and the left-side guide surface 15 form the coin cassette attachment unit 16. The taking-in unit 17 is formed in the cassette placement surface 12. A cassette opening 18 is formed in the cassette abutting surface 13.

Note that, the cassette opening 18 may be formed in the cassette placement surface 12. The taking-in unit 17 may be formed in the cassette abutting surface 13. The shape of the hopper 20 and the position of the supply port 20A may vary depending on the position at which the taking-in unit 17 is formed.

A coin cassette 60 illustrated in FIG. 5A is a container used when a coin is transferred between the coin processing apparatus 1 and another apparatus, for example, another coin processing apparatus disposed in the front office. The coin cassette 60 is attached to the coin cassette attachment unit 16 by being placed on the cassette placement surface 12 and then slidingly moving on the cassette placement surface 12, while being guided by the right-side guide surface 14 and the left-side guide surface 15, until the coin cassette 60 abuts on the cassette abutting surface 13.

Figure 5B:
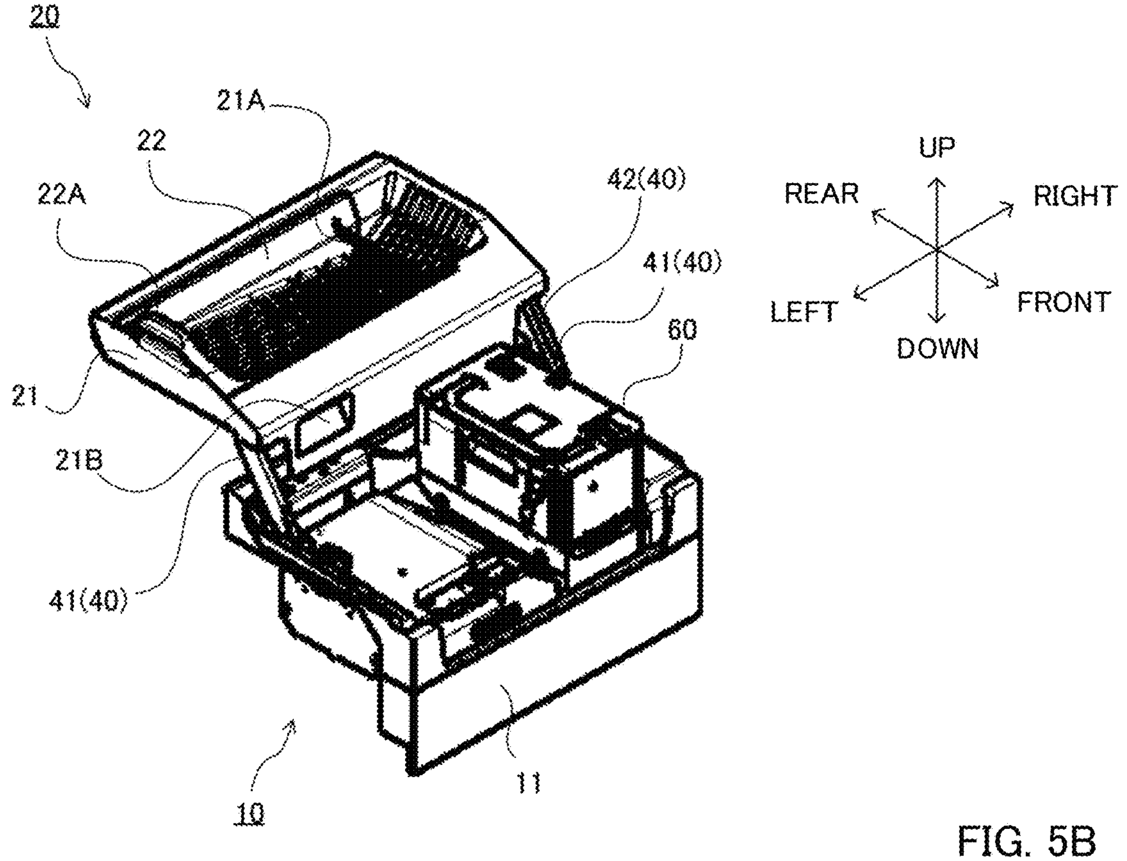
FIG. 5B is a partial perspective view of the portion around the hopper.

FIG. 5B is a partial perspective view of the portion around the hopper 20 in a state in which the coin cassette 60 is attached to the coin cassette attachment unit 16. In the coin cassette 60, a coin discharge port is formed at a position facing the cassette opening 18 when the coin cassette 60 is attached to the coin cassette attachment unit 16. Further, a discharge mechanism for discharging a coin outside the coin cassette 60 from the coin discharge port is disposed inside the coin cassette 60. Further, a connector that receives power and a control signal is disposed on the outer surface of the coin cassette 60. Further, a connector that supplies power and a control signal is disposed in the coin cassette attachment unit 16. When the coin cassette 60 is attached to the coin cassette attachment unit 16, the connector disposed on the outer surface of the coin cassette 60 is connected to the connector disposed in the coin cassette attachment unit 16. When these connectors are connected to each other, the control unit disposed inside the main body 10 is in a state of being capable of controlling the coin cassette 60. Note that, a sensor which detects that the coin cassette 60 is properly attached to the coin cassette attachment unit 16 may be disposed in the coin cassette attachment unit 16.

Subsequently, an operation example when a coin is deposited into the coin processing apparatus 1 via the hopper 20 will be described.

An operator operates the operation display 30, and inputs an instruction for performing coin depositing processing via the hopper 20 into the coin processing apparatus 1. Subsequently, with the coin processing apparatus 1 in the state illustrated in FIGS. 2, 3A and 4A, the operator inserts a coin into the hopper 20.

After the coin to be deposited is inserted into the hopper 20, the operator lifts the knob part 22A and swings the tray 22 around the shaft member 21A. Then, the coin on the upper surface of the tray 22 or the upper surface of a frame part of the cover 21 slides down toward the supply port 20A. The coin that has slid down toward the supply port 20A passes through the supply port 20A and drops into the taking-in unit 17. The coin that has dropped into the taking-in unit 17 is taken in into the coin processing apparatus 1 through the taking-in unit 17 and is subjected to predetermined processing.

After confirming that the coin inserted into the hopper 20 has passed through the supply port 20A, the operator returns the tray 22 to the original state. The above-described operation is repeated until every coin to be deposited passes through the supply port 20A. Thereafter, the operator operates the operation display 30 to complete the coin depositing processing.

Next, an operation example when a coin is deposited from the coin cassette 60 into the coin processing apparatus 1 will be described.

An operator operates the operation display 30, and inputs an instruction for performing coin depositing processing using the coin cassette 60 into the coin processing apparatus 1. In a case where the hopper 20 is at the position illustrated in FIGS. 2, 3A and 4A, the operator moves the hopper 20 to the position illustrated in FIGS. 4D and 5A. After confirming that the hopper 20 is located at the position illustrated in FIGS. 4D and 5A, the operator attaches the coin cassette 60 to the coin cassette attachment unit 16.

When the coin cassette 60 is attached to the coin cassette attachment unit 16, the coin cassette 60 is supplied with a predetermined control signal from the control unit, and the discharge mechanism inside the coin cassette 60 operates. Then, a coin within the coin cassette 60 passes through the coin discharge port and the cassette opening 18 and is taken in into the coin processing apparatus 1. The coin that has been taken in into the coin processing apparatus 1 is subjected to predetermined processing.

When every coin within the coin cassette 60 is taken in into the coin processing apparatus 1, the control unit stops the operation of the discharge mechanism inside the coin cassette 60 and causes the operation display 30 to display that the taking-in is completed. The operator who has confirmed the display detaches the coin cassette 60 from the coin cassette attachment unit 16 and returns the hopper 20 to the original position. Thereafter, the operator operates the operation display 30 to complete the coin depositing processing.

Thus, when the operation of depositing a coin from the coin cassette 60 is performed, it is necessary to move the hopper 20. The hopper 20 comprised by the coin processing apparatus 1 according to the present embodiment is movable, while maintaining the horizontal state, from a position at which the hopper 20 covers the coin cassette attachment unit 16 and the taking-in unit 17 to a position at which the coin cassette attachment unit 16 and the taking-in unit 17 are exposed. As a result, even in a case where a coin or a foreign object is on the hopper 20 when the hopper 20 is moved, it is possible to prevent the coin or the foreign object from dropping or being scattered into the taking-in unit 17 or around the coin processing apparatus 1. Assuming that a coin is on the hopper 20 and drops into the taking-in unit 17 when the hopper 20 is moved, the coin which is not a coin within the coin cassette 60, that is, the coin which is not to be deposited is deposited into the coin processing apparatus 1. The coin processing apparatus 1 according to the present embodiment makes it possible to preliminarily prevent such a situation from occurring.

Further, the hopper 20 comprised by the coin processing apparatus 1 according to the present embodiment may be moved during maintenance. Even in such a case, the hopper

20 moves while maintaining the horizontal state. As a result, even when a coin or a foreign object is on the hopper 20, it is possible to prevent the coin or the foreign object from dropping or being scattered into the taking-in unit 17 or around the coin processing apparatus 1.

Note that, in the coin processing apparatus 1 according to the present embodiment, the taking-in unit 17 is disposed in the cassette placement surface 12. As a result, when the coin cassette 60 is attached to the coin cassette attachment unit 16, the taking-in unit 17 is covered by the coin cassette 60. Accordingly, while a coin is being inserted from the coin cassette 60, it is possible to preliminarily prevent a coin, which is not to be inserted, or a foreign object from accidentally entering the main body 10 through the taking-in unit 17.

Further, in the coin processing apparatus 1 according to the present embodiment, the hopper moving mechanism 40 moves the hopper 20 to the space S that is a space downward from the operation display 30. As a result, a space required to dispose and use the coin processing apparatus 1, including a space required while the hopper 20 is moving, can be made small. Further, since the front side of the operation display 30 is not closed by the hopper 20 after the hopper 20 is moved, the operation display 30 can be easily operated before and after the hopper 20 is moved, and it is possible to surely visually confirm information displayed on the operation display 30. In addition, since the trajectory drawn when the hopper 20 moves can be small, it is possible to dispose the operation display 30 at a low position on the front side of the coin processing apparatus 1. As a result, every operator, for example, even an operator in a wheelchair can easily operate the operation display 30.

The coin processing apparatus according to the present disclosure is not limited to those of the embodiments described thus far, and comprises various modifications without departing from the spirit of the present disclosure.

Damper Mechanism

For example, the hopper moving mechanism may comprise a damper that reduces an impact applied to the hopper when the hopper is moved. Hereinafter, an example of a damper that can be comprised by the coin processing apparatus according to the present disclosure will be described while referring again to the coin processing apparatus 1 according to Embodiment 2.

Figure 6A:
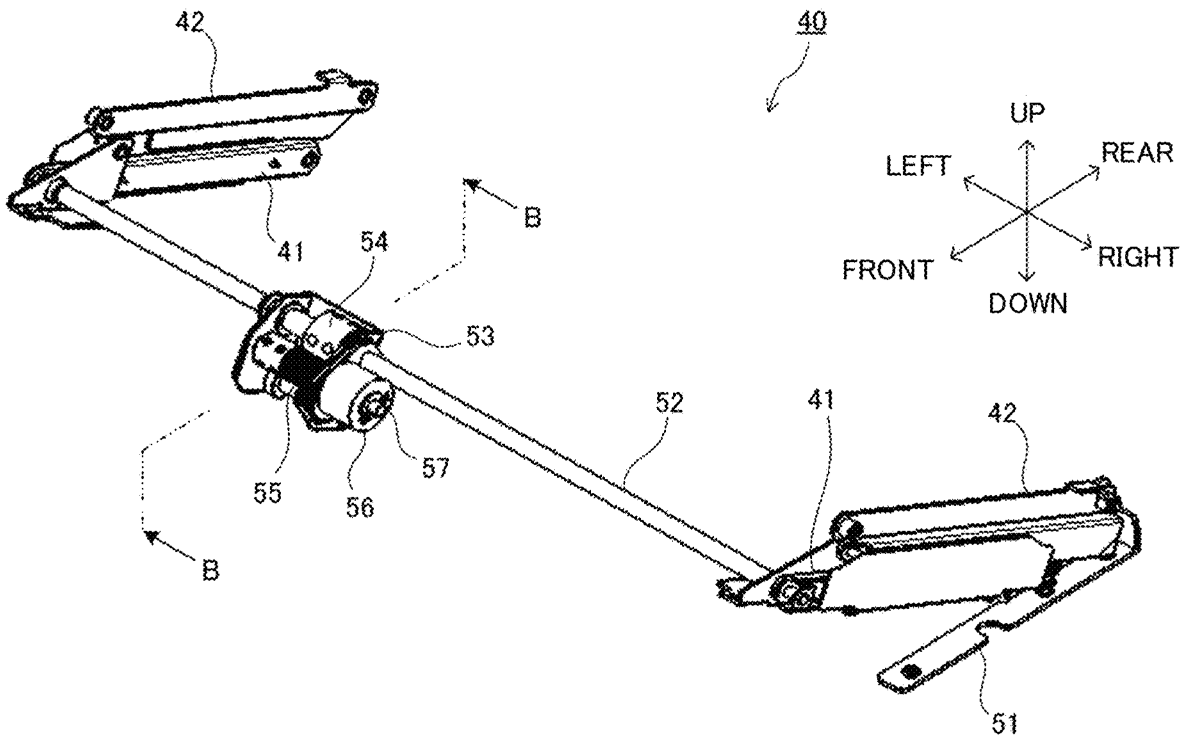
FIG. 6A is a perspective view of a hopper moving mechanism.
Figure 6B:
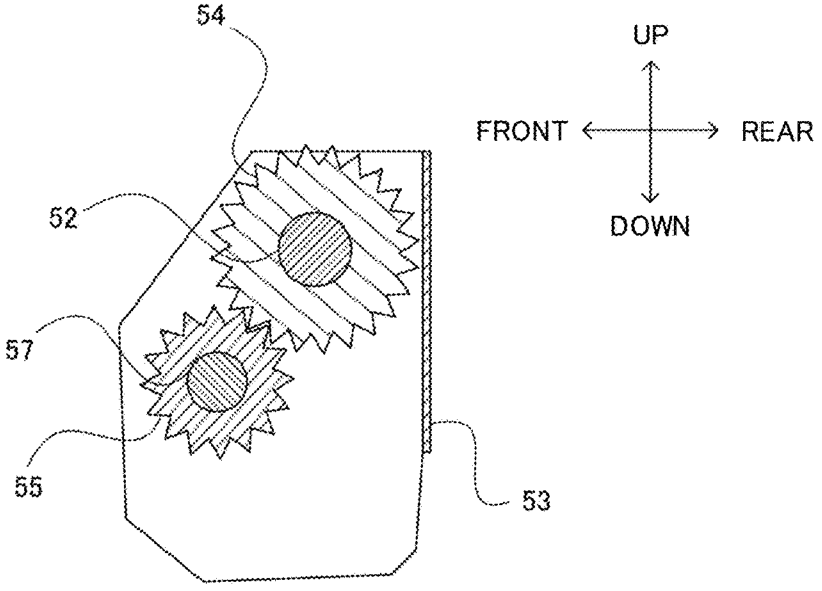
FIG. 6B is a cross-sectional schematic view taken along line B-B and seen in a direction of arrows B in FIG. 6A.

FIG. 6A is a perspective view of the hopper moving mechanism 40. FIG. 6B is a cross-sectional schematic view taken along line B-B and seen in a direction of arrows B in FIG. 6A and corresponds to a cross-sectional view viewed from the right side.

The first links 41 and the second links 42 are attached to the main body 10 (not illustrated in FIG. 6A) via brackets 51. A connection rod 52 is fixed, for example, so as not to be relatively rotatable by welding between one end part of the first link 41 on the left side and one end part of the first link 41 on the right side. That is, when the first link 41 rotates around a side of another end of the first link 41 for moving the hopper 20, the connection rod 52 relatively rotates with respect to the main body 10 and the hopper 20 while relatively moving with respect to the main body 10. Note that, the connection rod 52 may be fixed between one end part of the second link 42 on the left side and one end part of the second link 42 on the right side.

A gear case 53 is disposed near a center of the connection rod 52 in the left-right direction. The gear case 53 is configured to be relatively rotatable with respect to the connection rod 52. The gear case 53 is fixed to the hopper 20. The gear case 53 is not relatively movable with respect to the hopper 20.

A first gear 54 is disposed near the center of the connection rod 52 in the left-right direction. The first gear 54 is disposed inside the gear case 53. The first gear 54 is fixed to the connection rod 52. The first gear 54 is not relatively rotatable with respect to the connection rod 52.

A second gear 55 is disposed inside the gear case 53. The second gear meshes with the first gear 54. The second gear 55 is fixed to a damper shaft 57 to be described later. The second gear 55 is not relatively rotatable with respect to the damper shaft 57.

A damper 56 is disposed on the outer side of the gear case 53. The damper 56 is fixed to the gear case 53. The damper 56 is not relatively movable with respect to the gear case 53. The damper 56 comprises the damper shaft 57. The damper shaft 57 is configured to be relatively rotatable with respect to the damper 56.

The damper 56 is configured to exert a buffering function when the damper shaft 57 rotates in a predetermined direction, and is configured not to exert the buffering function when the damper shaft 57 rotates in a direction opposite thereof. Hereinafter, a rotational direction in which the damper 56 exerts the buffering function is described as "first rotational direction", and a rotational direction in which the damper 56 does not exert the buffering function is described as "second rotational direction". In FIG. 6B, the clockwise rotation of the damper shaft 57 corresponds to the first rotational direction, and the counterclockwise rotation of the damper shaft 57 corresponds to the second rotational direction.

When the hopper moving mechanism 40 is configured as described above, the damper 56 functions as follows. When the hopper 20 is moved from the position at which the hopper 20 covers the coin cassette attachment unit 16 and the taking-in unit 17 (the position illustrated in FIG. 4A) to a position within the space S downward from the operation display 30 (the position illustrated in FIG. 4D), the connection rod 52 rotates clockwise when viewed from the right side (that is, in FIG. 6B). As a result, the damper shaft 57 rotates counterclockwise (in the second rotational direction). Accordingly, the buffering function is not exerted, and it is possible to move the hopper 20 from the front side to the rear side with a relatively small force. Further, when the hopper 20 is moved from the position in the space S downward from the operation display 30 (the position illustrated in FIG. 4D) to the position at which the hopper 20 covers the coin cassette attachment unit 16 and the taking-in unit 17 (the position illustrated in FIG. 4A), the connection rod 52 rotates counterclockwise, and the damper shaft 57 rotates clockwise (in the first rotational direction). As a result, the buffering function is exerted, and even when an operator releases his/her hand from the hopper 20 in the middle of moving the hopper 20, it is possible to prevent the hopper 20 from dropping on the main body 10 to cause an impact to be applied to the hopper 20 and the main body 10. Further, since the hopper 20 slowly drops even when the operator releases his/her hand from the hopper 20 in the middle of moving the hopper 20, it is possible to prevent the hand of the operator from being accidentally caught between the hopper 20 and the main body 10.

The damper 56 may exert the buffering function at the moment when the rotational direction of the damper shaft 57 switches from the second rotational direction to the first rotational direction. The damper 56 may not exert the buffering function at the moment when the rotational direction of the damper shaft 57 switches from the second rotational direction to the first rotational direction, but may exert the buffering function after a rotation of a slight ineffective angle. The hopper moving mechanism 40 can be constructed compactly and at a low cost by configuring such that the damper 56 has an ineffective angle.

In a case where the damper 56 has an ineffective angle, when an operator releases his/her hand from the hopper 20 in the middle of moving the hopper 20 from the front side toward the rear side (that is, performing a lifting operation), the buffering function is not exerted and the hopper 20 drops by even a slight distance. However, it is possible to cause the rotational angle of the second gear 55 and the damper shaft 57 to be larger than the rotation angle of the connection rod 52 and the first gear 54 by configuring such that the number of teeth of the second gear 55 is fewer than the number of teeth of the first gear 54. That is, it can be configured such that only a slight downward movement of the hopper 20 causes the rotational of the ineffective angle to be completed and the buffering function to be quickly exerted. Note that, the numbers of teeth illustrated in FIG. 6B are merely exemplary. For example, the number of teeth of the first gear 54 can be configured as 21 and the number of teeth of the second gear 55 can be configured as 13.

Other Embodiments

Hereinafter, yet other embodiments will be described.

The hopper moving mechanism 40 formed of the parallel linkage may be configured such that the hopper 20 moves to the left side or the right side.

Figure 7A:
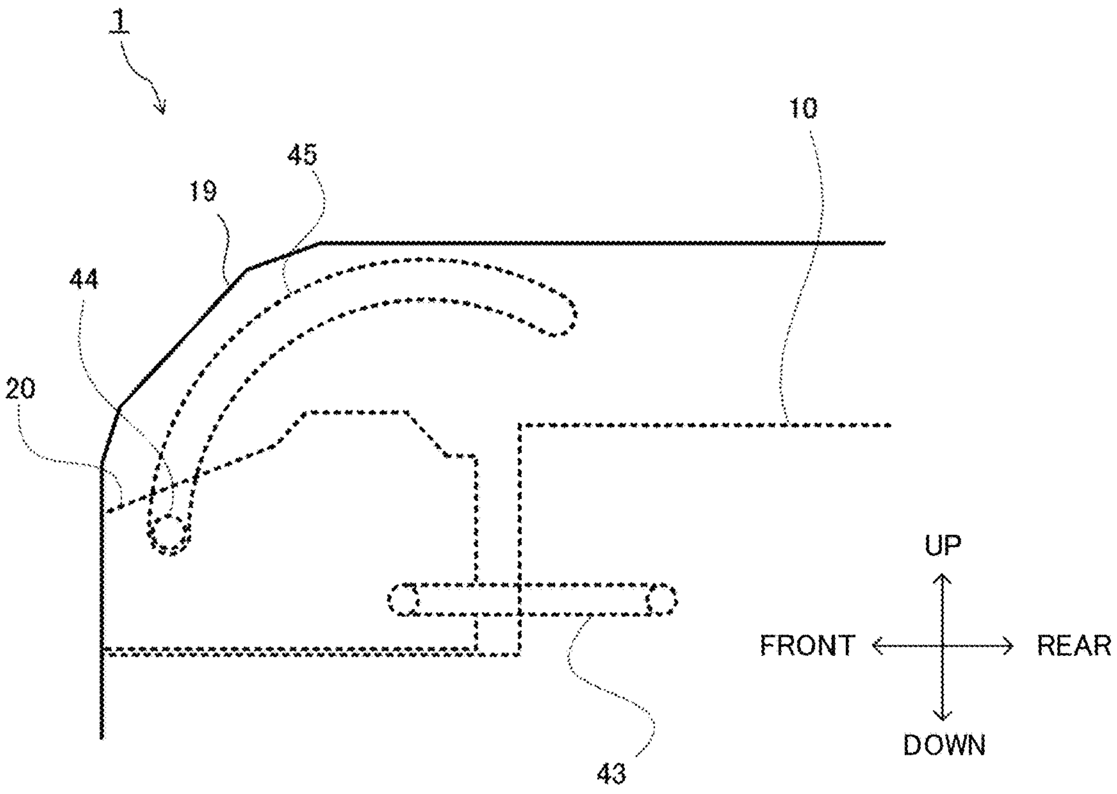
FIG. 7A is a schematic diagram illustrating an example of another linkage.
Figure 7B:
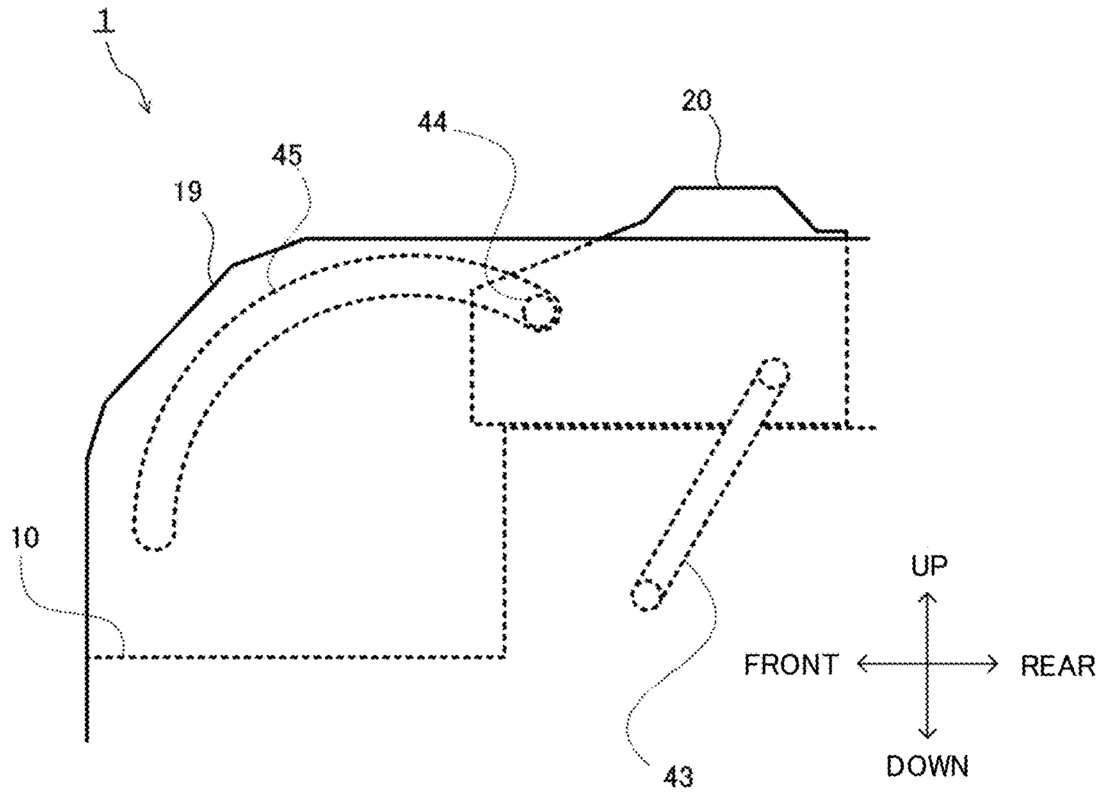
FIG. 7B is a schematic diagram illustrating the example of the other linkage.

The hopper moving mechanism 40 may be formed of another linkage different from the parallel linkage. FIGS. 7A and 7B are right side views of a coin processing apparatus 1 schematically illustrating an example of another linkage. In this modification, the main body 10 comprises a left and right pair of side plates 19 in an upper part and on the front side of the main body 10. The hopper 20 is disposed between the pair of side plates 19.

The hopper moving mechanism 40 according to this embodiment comprises a left and right pair of single links 43, a left and right pair of guide rollers 44, and a left and right pair of guide grooves 45. The guide grooves 45 are formed on inner-side surfaces of the left and right pair of side plates 19 and have an arcuate shape.

One end parts of the single links 43 are rotatably attached to the main body 10. Another end parts of the single links 43 are rotatably attached to portions near left and right end parts of the hopper 20. Further, the guide rollers 44 are rotatably attached to the hopper 20 so as to protrude from left and right end surfaces of the hopper 20. The guide rollers 44 are movably disposed in the guide grooves 45 formed inside the left and right pair of side plates 19.

When the coin processing apparatus 1 according to this modification is used, an operator moves the hopper 20 so as to push the hopper 20 rearward while lifting the hopper 20 in the same manner as in the operation of the hopper 20 comprised by the coin processing apparatus 1 according to Embodiment 2. Then, the single link 43 rotates around one end part fixed to the main body 10. The hopper 20 moves along an arcuate trajectory drawn by another end part of the single link 43. At this time, the guide roller 44 moves in the guide groove 45. Further, the shape of the guide groove 45 is determined such that relative positions of the other end part of the single link 43 (the end part thereof on a side of the hopper 20) and the guide roller 44 do not change. As a result, the hopper 20 can move, while maintaining the horizontal state, between the position at which the hopper 20 covers the coin cassette attachment unit 16 and the taking-in unit 17 (the position illustrated in FIG. 7A) and the position so that the coin cassette attachment unit 16 and the taking-in unit 17 (the position illustrated in FIG. 7B) are exposed, in other words, at which the hopper 20 uncovers the coin cassette attachment unit 16 and the taking-in unit 17.

The hopper moving mechanism 40 may be configured in still other embodiments. For example, the hopper moving mechanism 40 may comprise a sliding mechanism that slidingly moves the hopper 20 in a horizontal direction, in a vertical direction or in an obliquely upward direction. The direction in which the hopper 20 is slid is not limited to the front-rear direction as illustrated in FIG. 1, but may be the left-right direction. The obliquely upward direction can be configured as a direction in which the hopper 20 moves to the front side, the rear side, the left side or the right side as the hopper 20 rises. The sliding mechanism may comprise a member which telescopically extends and retracts and which connects the main body 10 and the hopper 20. The sliding mechanism may comprise a rod-like member which connects the main body 10 and the hopper 20 and which is capable of protruding from or entering the main body 10.

The hopper moving mechanism 40 may comprise a lifting and lowering mechanism that pushes up or pulls up the hopper 20. That is, the hopper 20 may move upward and downward not by a force applied by an operator, but by a driving apparatus comprised by the coin processing apparatus 1. For example, the hopper 20 may be connected to an upper end of a rod-shaped member that is lifted and lowered by the driving apparatus disposed within the main body 10, and the hopper 20 may move upward and downward with upward and downward movements of the rod-shaped member. The hopper 20 may move upward and downward by a driving apparatus and a hoist-like member that are disposed upward from the main body 10. The driving apparatus is integrated with or separate from the main body 10. The hoist-like member moves upward and downward by an operation of the driving apparatus.

In the coin processing apparatus 1 according to Embodiment 2, the supply port 20A of the hopper 20 is opened and closed by moving the tray 22 disposed within the cover 21. That is, the tray 22 functions as an opening and closing member, but the opening and closing of the supply port 20A may also be performed by another opening and closing member. For example, the hopper 20 may comprise a shutter member that opens and closes the supply port 20A or may comprise a rotary valve-like member.

The movement of the hopper 20 in a state in which the hopper 20 is maintained in the horizontal state comprises not only the translational motion, but movement of the hopper 20 while changing the attitude to the extent that the a foreign object or a coin on the hopper 20 does not drop during the movement. That is, movement of the hopper 20 while the reception port on the upper side of the hopper 20 is maintained at a position higher than that of the supply port 20A on the lower side of the hopper 20 is comprised in the movement of the hopper 20 in a state in which the hopper 20 is maintained in the horizontal state.

However, it should be noted that the fact that the hopper 20 is maintained in the horizontal state does not assume that the reception port is located at a position higher than that of the supply port 20A. For example, the hopper 20 may comprise a conveyor-like apparatus and may comprise the supply port 20A disposed at a position higher than that of the reception port or at the same height position as that of the reception port. In a case where the hopper 20 has such a configuration, the hopper moving mechanism 40 according to Embodiment 2, for example, can cause a translational motion of the hopper 20 while causing the supply port 20A to be located at a position higher than that of the reception port or at the same height position as that of the reception port. That is, it is possible to move the hopper 20 while maintaining the hopper 20 in the horizontal state.

The coin processing apparatus according to the present disclosure is not necessarily disposed in the back office, but may be disposed in the front office.

The coin processing apparatus according to the present disclosure may be combined with a cashless settlement apparatus to form a multifunctional settlement apparatus.

The invention claimed is:

1. A coin processing apparatus, comprising:

a hopper that receives a coin through an opening and stores the coin, the opening being located on an upper side of the hopper;

a hopper moving mechanism that moves the hopper, while maintaining the hopper in a horizontal state, from a first position to a second position, wherein the first position is at which the hopper covers a slot that takes in the coin supplied from the hopper, and the second position is at which the slot is exposed; and a cassette placement surface which is covered by the hopper when the hopper is located at the first position and which is exposed when the hopper is located at the second position, wherein a coin is taken in from the hopper through the slot when the hopper is located at the first position, and a coin cassette is attachable to the cassette placement surface when the hopper is located at the second position, and a coin is taken in from the coin cassette when the coin cassette is attached to the cassette placement surface.

2. The coin processing apparatus according to claim 1, wherein the hopper moving mechanism translationally moves the hopper.

3. The coin processing apparatus according to claim 1, wherein the hopper moving mechanism comprises a linkage.

4. The coin processing apparatus according to claim 3, wherein the linkage is a parallel linkage.

5. The coin processing apparatus according to claim 3, wherein the linkage exposes the slot by moving the hopper from a frontward side toward a rearward side, the frontward side being a side where the slot is disposed.

6. The coin processing apparatus according to claim 1, wherein the hopper moving mechanism slidingly moves the hopper in a horizontal direction, in a vertical direction or in an obliquely upward direction.

7. The coin processing apparatus according to claim 1, wherein the hopper moving mechanism pushes or pulls the hopper.

8. The coin processing apparatus according to claim 1, wherein the hopper moving mechanism comprises a damper that reduces an impact applied to the hopper.

9. The coin processing apparatus according to claim 1, wherein the hopper comprises a supply port that supplies the coin stored in the hopper, the supply port opening and closing.

10. The coin processing apparatus according to claim 9, wherein the hopper further comprises a tray that opens and closes the supply port by swinging around a rotating shaft.

11. The coin processing apparatus according to claim 1, wherein the slot is disposed at a position at which the slot is covered by a coin cassette when the coin cassette is attached to the cassette placement surface.

12. The coin processing apparatus according to claim 1, further comprising an operation display, wherein the hopper moving mechanism is configured to move the hopper to a space downward from the operation display.

13. The coin processing apparatus according to claim 1, wherein the slot is in the cassette placement surface.

14. The coin processing apparatus according to claim 1, wherein the slot is in a surface separate from the cassette placement surface.

15. A coin processing apparatus, comprising:

a hopper that receives a coin through an opening and stores the coin, the opening being located on an upper side of the hopper;

a cassette placement surface; and a hopper moving mechanism that moves the hopper, while maintaining the hopper in a horizontal state, from a first position to a second position, wherein the first position is at which the hopper covers the cassette placement surface, and the second position is at which the cassette placement surface is exposed, wherein a coin is taken in from the hopper when the hopper is located at the first position, and a coin cassette is attachable to the cassette placement surface when the hopper is located at the second position, and a coin is taken in from the coin cassette when the coin cassette is attached to the cassette placement surface.

* * * * *